United States Patent

Sweeney

[15] 3,647,163
[45] Mar. 7, 1972

[54] FOLDABLE SEMIRIGID AIRFOIL FOR AIRBORNE VEHICLES

[72] Inventor: Thomas E. Sweeney, 61 Overbrook Drive, Princeton, N.J. 08540

[22] Filed: Nov. 19, 1969

[21] Appl. No.: 877,945

[52] U.S. Cl..............................................244/49
[51] Int. Cl..............................................B64c 3/56
[58] Field of Search..........................244/49, 46, 47, 43

[56] References Cited

UNITED STATES PATENTS

| | | | |
|---|---|---|---|
| 1,928,336 | 9/1933 | Kindelberger | 244/49 |
| 3,330,501 | 7/1967 | Barber | 244/47 |
| 3,507,150 | 4/1970 | Stengel | 244/49 X |

Primary Examiner—Milton Buchler
Assistant Examiner—Carl A. Rutledge
Attorney—Darby & Darby

[57] ABSTRACT

The present invention relates to a foldable, composite rigid and semirigid airfoil for use with airborne vehicles. The airfoil includes a rigid portion. A hinged rigid spar defines a leading edge of the airfoil. The trailing edge of the airfoil is defined by both a rigid aileron structure forming part of the rigid wing portion, and a cable which interconnects the rigid portion of the airfoil with a root point of attachment on the fuselage of the vehicle. Flexible material forms top and bottom airfoil surfaces of the collapsible wing portion when the airfoil is deployed, said airfoil surfaces being continuous with the aerodynamic form of the rigid wing portion.

10 Claims, 4 Drawing Figures

PATENTED MAR 7 1972 3,647,163

INVENTOR
THOMAS E. SWEENEY

BY Darby + Darby

ATTORNEYS

FOLDABLE SEMIRIGID AIRFOIL FOR AIRBORNE VEHICLES

This invention relates to semirigid airfoils, or sailwings, and more particularly to foldable, composite rigid and semirigid airfoil apparatus.

The use of airfoils of semirigid construction in which a rigid spar supports a flexible wing form dates back to the earliest successes enjoyed by the pioneers of flight. Improved semirigid airfoil structures of the sailwing type are disclosed in U.S. application, Ser. No. 740,895, filed June 28, 1968.

Rigid wing structures presently known to the art are considerably more expensive to fabricate than semirigid or flexible winged aircraft. Efforts to fold rigid wings have resulted in complex and costly structures. These costs are necessarily passed on to the purchaser of such craft, which in many cases may be one of the growing numbers of persons who own a small plane for pleasure or business.

There is an increasing need for aircraft having folding wings for ease in storage and transportation of the aircraft. While many folding wing devices and methods have been developed for conventional hard wings, none is completely satisfactory from the consideration of weight, cost, complexity and maintenance requirements.

It is an object of the present invention to provide an aircraft having a foldable composite wing structure which is especially suited for low and moderate speed aircraft.

Another object of this invention is to provide a composite wing structure having both a rigid portion and a collapsible portion, the collapsible portion comprising a semirigid airfoil or sailwing fillet.

A still further object is to provide an aircraft wing structure which combines the advantages of having both ailerons in a rigid portion for performing functions such as roll control of the aircraft, as well as a sailwing fillet portion which possesses favorable aerodynamic characteristics as well as an ability to collapse upon folding of the wing structure.

The present invention fulfills the aforementioned objects and overcomes limitations and disadvantages of prior art solutions to existing problem by providing, in a preferred embodiment of the invention, a composite wing structure for use with airborne vehicles. The wing structure or assembly includes an outboard rigid wing portion and a collapsible semirigid airfoil or sailwing fillet portion. A hinged rigid spar member defines the leading edge of the wing assembly. The rigid airfoil portion includes movable rigid ailerons which define the trailing edge of the rigid wing portion, while a trailing edge cable extends in tension between the rigid airfoil portion and a root point on the fuselage of the aircraft thereby defining the trailing edge of the collapsible portion when the wing is deployed. Flexible materials which interconnect the rigid wing portion and the fuselage and, defines upper and lower aerodynamic surfaces which are continuous with the aerodynamic wing form surfaces of the rigid wing portion.

The invention will be more clearly understood from the following description of specific embodiments of the invention together with the accompanying drawing wherein similar reference characters denote similar elements throughout several views, and in which.

Figure 1:
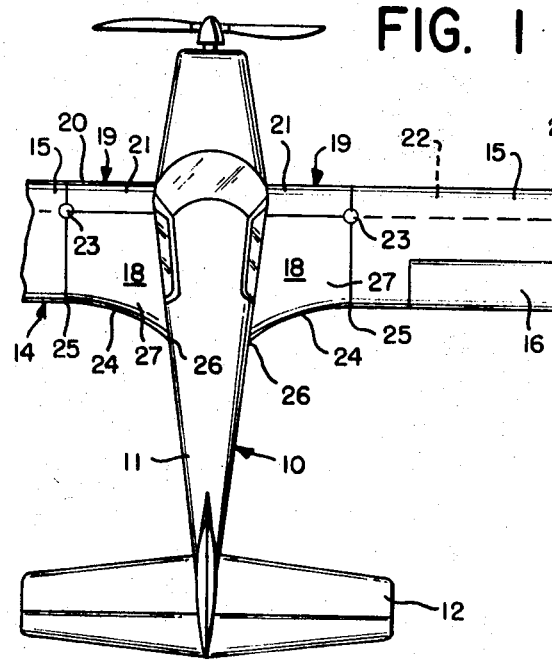
FIG. 1 is a fragmentary plan view of an aircraft having a composite foldable wing structure according to the present invention.

Referring now in more detail to the drawing, an aircraft 10 includes a conventional fuselage portion 11, a tail portion 12 and two wing assemblies 23 and 14. Wing assemblies 13 and 14 are composite in that they each include a rigid wing portion 15 having an aileron 16 and wing tip fairing 17, as well as a collapsible wing portion 18.

Wing assemblies 13 and 14 possess similar elements and behave in the same manner. Looking at wing assembly 13, a rigid hinged spar member 19 defines the leading edge 20 of the wing form. Spar member 19 includes an immovable portion 21 which is secured, such as by welding, to fuselage 11, and a movable portion 22 which is integral with and located within rigid wing portion 15. Spar portions 21 and 22 pivot with respect to one another about a hinged axis designated reference character 23.

Collapsible wing portion 18 constitutes a wing assembly fillet which interconnects rigid wing portion 15 with the fuselage. Wing portion 18 includes a trailing edge cable 24 which extends between a point of attachment 25 on rigid wing portion 15 and a root point 26 on fuselage 11. Trailing edge cable 24, together with the trailing edge of rigid wing portion 15 and aileron 16, define the overall trailing edge of wing assembly 13. In the deployed position shown in FIG. 1, wing assembly 13 exhibits aerodynamic characteristics comparable to a conventional rigid or hard wing. In-flight roll is controlled by aileron 16 in a conventional manner.

Collapsible wing portion 18 further includes flexible wing material 27 extends over and between spar member 19 and trailing edge cable 24 in a manner described in U.S. Pat. application, Ser. No. 740,895, filed June 28, 1968. A seam of this flexible material is secured to cable 24, such as by providing eyelets or lacing secured to the seam through which cable 24 is passed. Material 27 is preferably made of dacron sailcloth impregnated with silicon, but may also be canvas, plastic or other suitable flexible material. Material 27 is secured at its perimeter to fuselage 11, spar portion and wing portion 15. It is material 27 which defines the shape or form of collapsible wing portion 18 and this aerodynamic wing form is continuous with the aerodynamic wing form of rigid wing portion 15.

Figure 2:
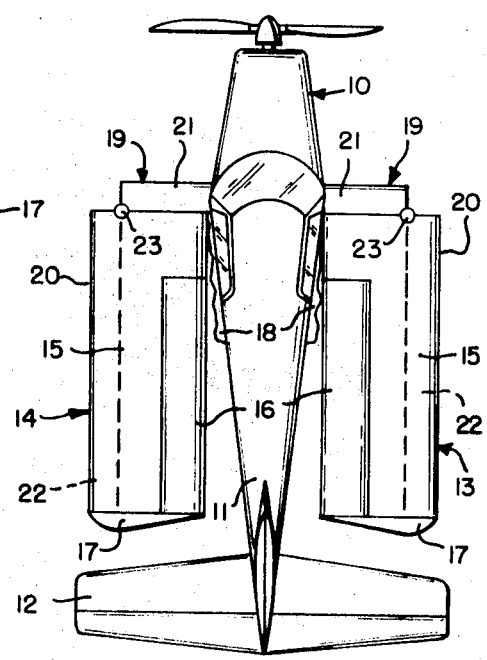
FIG. 2 is a plan view of the aircraft of FIG. 1 illustrating the wing structure in a folded position.

FIG. 2 illustrates wing assemblies 13 and 14 in their folded position, as would be the case when aircraft 10 is stored in a hangar or being transported, for example. The amount of room taken up by aircraft 10 with wing assemblies 13 and 14 in their folded position is relatively small compared to the room taken up by the aircraft with its wing assemblies deployed. The folding of wing assemblies 13 and 14 is accomplished either manually or by other suitable automatic means controlled by the pilot of the craft. The distance between hinge axis 23 and point of attachment 25 is slightly smaller than the length of the immovable portion 21 of the spar member 19. Thus, when folded, the outward extension of wing assemblies 13 and 14 is less than the outward projections of tail 12 of aircraft 10, as shown in FIG. 2.

Figure 3:
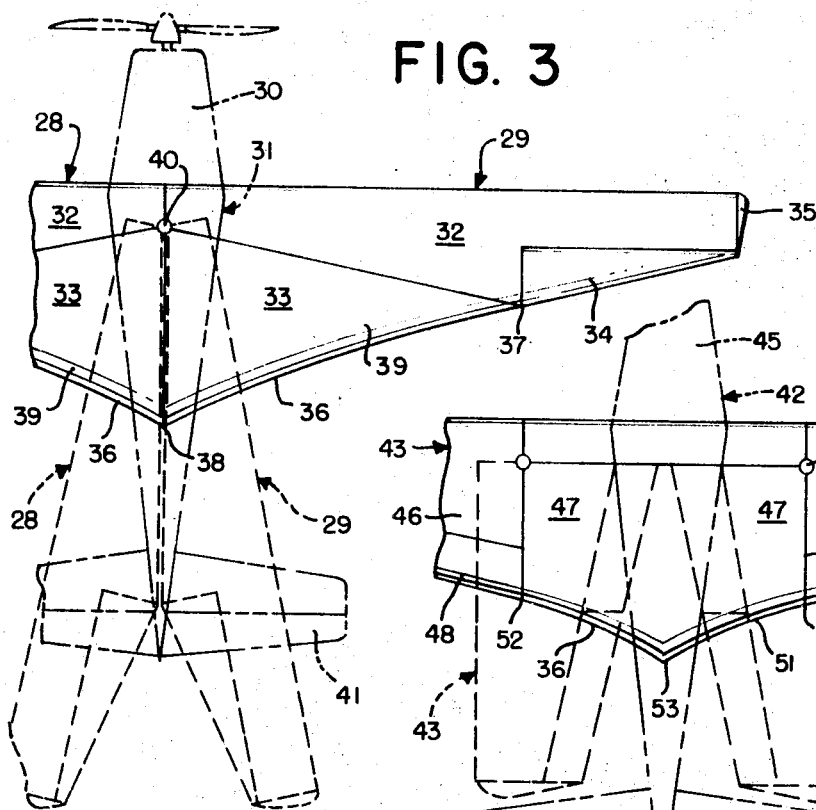
FIG. 3 is a fragmentary plan view of a composite, foldable wing assembly secured to the top of the fuselage of an aircraft, and wherein the axes about which the wings of the aircraft pivot when being folded are coincidental.
Figure 4:
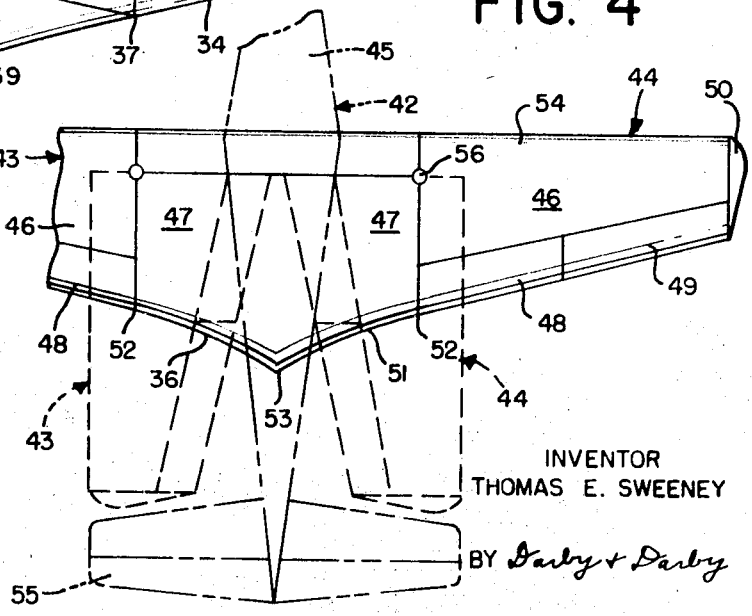
FIG. 4 is a fragmentary plan view of a composite foldable wing assembly illustrating both deployed and folded wing positions.

Referring now to FIGS. 3 and 4, wing assemblies are shown which are secured to the fuselage of the aircraft at its uppermost portion. FIG. 3 shows composite wing assemblies 28 and 29 secured to the top of fuselage 30 of aircraft 31, the aircraft being shown in phantom outline. Wing assemblies 28 and 29 are similar in structure and behavior. Wing assembly 29 includes a rigid wing portion 32 having an aerodynamic wing form which is continuous with the aerodynamic wing form of collapsible wing portion 33. Rigid wing portion 32 includes an aileron 34 and a conventional wing tip fairing 35. Collapsible wing portion 33 includes a trailing edge cable 36 much like cable 24 which extends between a point of attachment 37 on rigid wing portion 32 and a root point 38 on the top of fuselage 30.

Flexible material 39 of the type described as material 27 interconnects rigid wing portion 32 with fuselage 30. A feature of aircraft 31 which distinguishes it from aircraft 10 is the provision of a common hinge axis 40 about which wing assemblies 28 and 29 are both pivoted during their folding between their deployed positions shown in full line in FIG. 3 and their folded position shown in phantom outline. As in the case of aircraft 10 described for FIG. 2, wing assemblies 28 and 29 when folded do not project transversely from fuselage 30 a distance equal to or greater than the projection of tail 41 of the aircraft.

FIG. 4 illustrates yet another embodiment of the invention wherein foldable composite wing assemblies 43 and 44 are secured together at the top of fuselage 45 of an aircraft 42. In this embodiment a wing structure similar to that described for FIGS. 1 and 2 is shown. A rigid wing portion 46 together with a collapsible wing portion 47 make up wing assembly 44. Rigid wing portion 46 includes ailerons 48 and 49 and wing tip fairing 50.

Collapsible wing portion 47 includes a trailing edge cable 51 which extends between a point of attachment 52 on rigid wing portion 46 and a common root point 53 for wing assemblies 28 and 29 on the top of fuselage 45. Rigid wing portion 46 is pivotable about hinge axis 56. A single fixed spar member 54 is used for both wing assemblies 43 and 44.

The distance between hinge axis 56 and point of attachment 52 is slightly less than one-half the length of fixed spar member 54 such that, when folded, wing assembly 44 will project outwardly from fuselage 45 a distance substantially equal to or less than one-half the span of tail 55 of aircraft 42, as shown in FIG. 4.

While the foldable wing assemblies 13, 29 and 44 have been described as being pivotable about axes 23, 40 and 53, respectively, it is of course obvious that locking means (not shown) are provided within the scope of this invention to maintain the wing structures in the deployed position during flight without the possibility of their pivoting.

The embodiments of the invention particularly disclosed are presented merely as examples of the invention. Other embodiments, forms and modifications of the invention coming within the proper scope of the appended claims will of course readily suggest themselves to those skilled in the art.

What is claimed is:

1. Aircraft apparatus comprising in combination, a body, a foldable composite airfoil assembly supported by said body comprising a rigid spar member at the leading edge of the airfoil assembly and extending substantially the entire length thereof, said spar member being connected to said body, said airfoil assembly having a first rigid portion extending for and including at least a portion of the length of said spar member, hinge means connected to said rigid airfoil portion for pivoting said rigid airfoil portion with respect to said body between a folded position and a deployed position, said airfoil assembly also having a second portion located between the body and said rigid portion of said airfoil assembly, said second portion including cable means secured between said body and said rigid portion of said airfoil assembly and flexible material attached to said body, said first portion of said airfoil assembly and to said cable means to complete the airfoil assembly, said cable means forming the trailing edge of said second airfoil assembly portion, said flexible material being unrestrained in the area between its connecting points to said body, said first airfoil portion and said cable means, and said cable also being unrestrained except at its two ends where attached to said body and said rigid portion respectively.

2. Aircraft apparatus as in claim 1, wherein said hinge means connects said first and second portions of said airfoil assembly, said flexible material being folded between the rigid portion of said airfoil assembly and the body as said airfoil assembly is folded.

3. Aircraft apparatus as in claim 2, wherein said flexible material is connected to a portion of said spar member which forms the leading edge of said second portion of said airfoil assembly.

4. Aircraft apparatus as in claim 2, wherein said hinge means is located at said spar member.

5. Aircraft apparatus as in claim 4, wherein said spar member is formed in two sections both of which have portions which are outboard of said body, one of said spar member sections defining the leading edge of said first rigid airfoil assembly portion and the other of said spar sections having the flexible material connected thereto and defining the leading edge of said second airfoil assembly portion.

6. Aircraft apparatus as in claim 5, wherein there are a pair of said airfoil assemblies, each assembly being located on a respective side of the body, the respective ends of each said cable of an airfoil assembly being connected at a common point on said body.

7. Aircraft apparatus as in claim 2, wherein there are a pair of said airfoil assemblies, each assembly being located on a respective side of the body, the respective ends of each said cable of an airfoil assembly being connected at a common point on said body.

8. Aircraft apparatus as in claim 2, wherein there are a pair of said airfoil assemblies, each assembly being located on a respective side of the body, the respective ends of each said cable of an airfoil assembly being connected to respectively different points on said body.

9. Aircraft apparatus as in claim 2, wherein there are a pair of said airfoil assemblies, each assembly being located on a respective side of the body, said hinge means for each said airfoil assembly being located at a common point on said body.

10. Aircraft apparatus according to claim 9, wherein said hinge means lies substantially in a longitudinal normally vertically extending plane of symmetry of said body.

* * * * *